(12) United States Patent
Kuo et al.

(10) Patent No.: US 11,604,900 B2
(45) Date of Patent: Mar. 14, 2023

(54) DATA DECRYPTION SYSTEM AND DATA DECRYPTION METHOD

(71) Applicant: Realtek Semiconductor Corporation, Hsinchu (TW)

(72) Inventors: Chen-Feng Kuo, Hsinchu (TW); Tung-Min Lin, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 105 days.

(21) Appl. No.: 17/197,175

(22) Filed: Mar. 10, 2021

(65) Prior Publication Data

US 2021/0294925 A1 Sep. 23, 2021

(30) Foreign Application Priority Data

Mar. 19, 2020 (TW) ................. 109109273

(51) Int. Cl.
| | |
|---|---|
| *G06F 21/79* | (2013.01) |
| *G06F 21/60* | (2013.01) |
| *H03K 19/21* | (2006.01) |
| *G06F 9/30* | (2018.01) |
| *G06F 21/85* | (2013.01) |

(52) U.S. Cl.
CPC .......... *G06F 21/79* (2013.01); *G06F 9/30101* (2013.01); *G06F 21/602* (2013.01); *G06F 21/85* (2013.01); *H03K 19/21* (2013.01); *G06F 2221/0751* (2013.01)

(58) Field of Classification Search
CPC ........ G06F 21/79; G06F 21/602; G06F 21/85; G06F 9/30101; G06F 2221/0751; H03K 19/21

See application file for complete search history.

(56) References Cited

U.S. PATENT DOCUMENTS

| | | | |
|---|---|---|---|
| 9,432,183 B1* | 8/2016 | Axnix ................... H04L 9/0894 |
| 2006/0269063 A1* | 11/2006 | Hauge .............. H04N 21/47211 |
| | | | 348/E7.056 |
| 2012/0008772 A1* | 1/2012 | Sugahara ................ G06F 21/80 |
| | | | 380/46 |

(Continued)

FOREIGN PATENT DOCUMENTS

| | | |
|---|---|---|
| CN | 1774684 A | 5/2006 |
| CN | 103154963 A | 6/2013 |

(Continued)

*Primary Examiner* — Philip J Chea
*Assistant Examiner* — Sangseok Park
(74) *Attorney, Agent, or Firm* — Locke Lord LLP; Tim Tingkang Xia, Esq.

(57) ABSTRACT

A data decryption system includes an address checking circuit, an encryption/decryption processor, and a computation circuit. The address checking circuit is configured to receive an address through an address channel. The computation circuit is coupled to the encryption/decryption processor. The computation circuit is configured to receive a reading data of the address from a storage device through a data channel in a first duration. The encryption/decryption processor computes a second key in a second duration, according to a first key and the address, and the second key is configured to decrypt the reading data, wherein the first duration overlaps with the second duration.

16 Claims, 5 Drawing Sheets

(56) References Cited

U.S. PATENT DOCUMENTS

| | | | | |
|---|---|---|---|---|
| 2012/0179876 A1* | 7/2012 | Guthrie | .............. | G06F 12/0895 |
| | | | | 711/E12.017 |
| 2013/0205139 A1* | 8/2013 | Walrath | .................. | G06F 21/72 |
| | | | | 713/190 |
| 2020/0356495 A1* | 11/2020 | Kim | ........................ | H04L 9/088 |

FOREIGN PATENT DOCUMENTS

| | | | |
|---|---|---|---|
| TW | 457427 B | 10/2001 | |
| TW | 201616831 A | 5/2016 | |

* cited by examiner

DATA DECRYPTION SYSTEM AND DATA DECRYPTION METHOD

CROSS-REFERENCE TO RELATED APPLICATION

This application claims priority to and the benefit of Taiwan Application Serial Number 109109273, filed on Mar. 19, 2020, the entire content of which is incorporated herein by reference as if fully set forth below in its entirety and for all applicable purposes.

BACKGROUND

Field of Disclosure

The disclosure generally relates to data systems and methods, and more particularly, to data decryption systems and data decryption methods.

Description of Related Art

In the current technology, the decryption engine has to spend time waiting for the external storage device for reading data in the decryption procedure. The decryption engine computes the key for decrypting data only after the decryption engine receives the data of the storage device. However, it wastes the time of the decryption engine waiting for reading data.

Accordingly, how to give considerations to both of the data integrity and the processing efficiency is an urgent problem to be solved.

SUMMARY

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

One aspect of the present disclosure is to provide a data decryption system including an address checking circuit, an encryption/decryption processor, and a computation circuit. The address checking circuit is configured to receive an address through an address channel. The computation circuit is coupled to the encryption/decryption processor. The computation circuit is configured to receive a reading data of the address from a storage device through a data channel in a first duration. The encryption/decryption processor computes a second key in a second duration according to a first key and the address, and the second key is configured to decrypt the reading data, wherein the first duration overlaps with the second duration.

One aspect of the present disclosure is to provide a data decryption method including steps of transmitting an address through an address channel to an address checking circuit and a storage device; receiving a reading data of the address from the storage device through a data channel in a first duration; and computing a second key in a second duration according to a first key and the address, wherein the first duration overlaps with the second duration.

BRIEF DESCRIPTION OF THE DRAWINGS

The disclosure can be more fully understood by reading the following detailed description of the embodiments, with reference made to the accompanying drawings as described below. It should be noted that the features in the drawings are not necessarily to scale. In fact, the dimensions of the features may be arbitrarily increased or decreased for clarity of discussion.

DETAILED DESCRIPTION

The technical terms "first", "second" and the similar terms are used to describe elements for distinguishing the same or similar elements or operations and are not intended to limit the technical elements and the order of the operations in the present disclosure. Furthermore, the element symbols/alphabets can be used repeatedly in each embodiment of the present disclosure. The same and similar technical terms can be represented by the same or similar symbols/alphabets in each embodiment. The repeated symbols/alphabets are provided for simplicity and clarity and they should not be interpreted to limit the relation of the technical terms among the embodiments.

Figure 1:
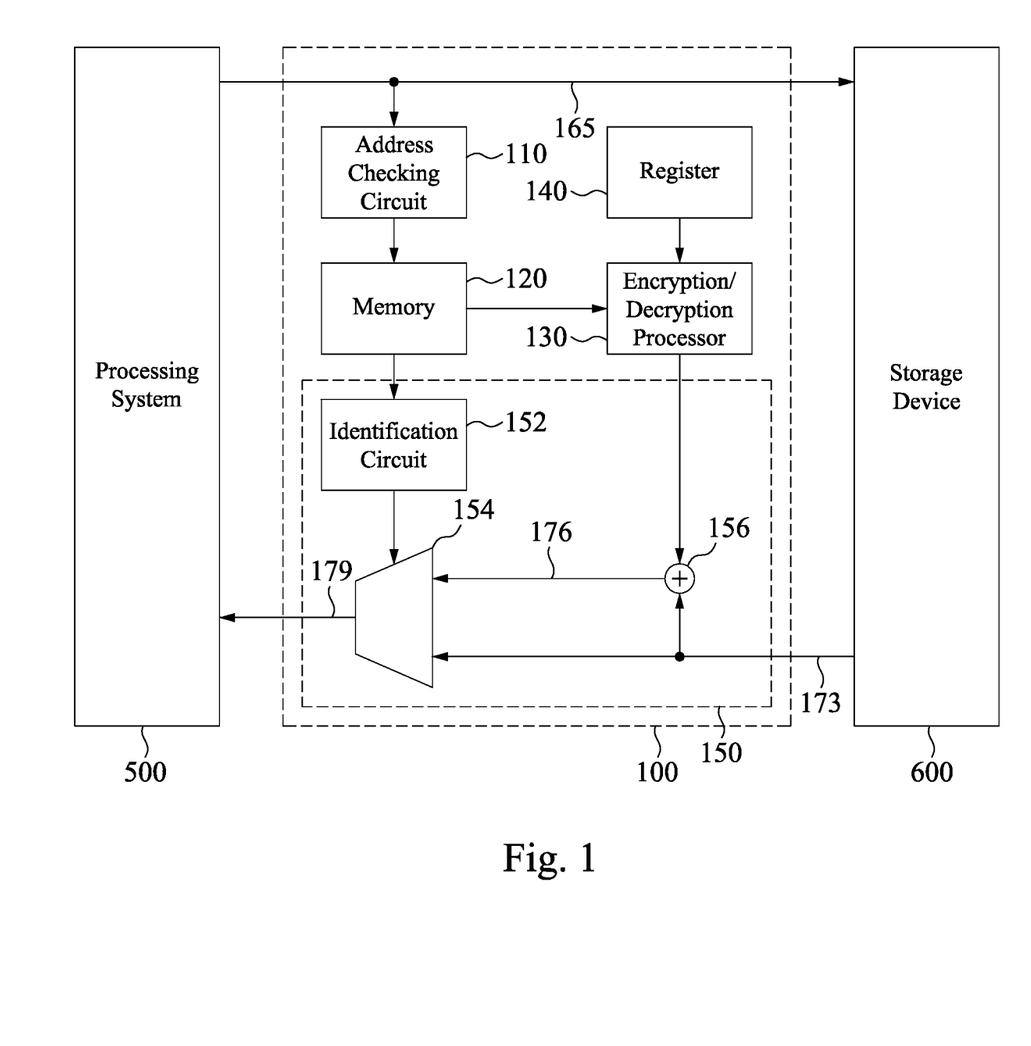
FIG. 1 is a block diagram of a data decryption system according to some embodiments of the present disclosure.

Reference is made to FIG. 1. FIG. 1 is a block diagram of a data decryption system 100 according to some embodiments of the present disclosure. The data decryption system 100 is connected to a processing system 500 and a storage device 600. In some embodiments, the processing system 500 transmits an access request, and the access request is forwarded to the data decryption system 100 and the storage device 600 through an address channel 165. The storage device 600 returns, according to the address of the access request, a reading data of the address through a data channel 173 to the data decryption system 100.

In some embodiments, data of the storage device 600 includes cipher-text data and plaintext data. The data decryption system 100 determines whether the data which is requested by the processing system 500 is the cipher data. If the requested data is the cipher-text data, the data decryption system 100 waits for the storage device 600 and computes a key for decrypting the data before the storage device 600 returns the data. Therefore, after the data decryption system 100 receives the returned data from the storage device 600, the data decryption system 100 can decrypt the data immediately.

In some embodiments, the cipher data stored in the storage device 600 is encrypted by symmetric encryption/decryption algorithms. The symmetric encryption/decryption algorithms are applied by the encryption/decryption processor 130 for generating the key. In some other embodiments, asymmetric encryption/decryption algorithms are also applied by the data decryption system 100 and the storage device 600 in the disclosure.

In some embodiments, the data of the storage device 600 includes instructions or file data. Any type of data of the storage device 600 can be applied in the present disclosure.

As shown in FIG. 1, the data decryption system 100 includes an address checking circuit 110, a memory 120, an encryption/decryption processor 130, a register 140, and a computation circuit 150. The memory 120 is coupled to the address checking circuit 110 and the encryption/decryption processor 130. The register 140 is coupled to the encryption/decryption processor 130. The computation circuit 150 is coupled to the memory 120 and the encryption/decryption processor 130.

In some embodiments, the address checking circuit 110 is configured to receive an address through the address channel 165. On the other hand, the address transmitted by the processing system 500 includes a target identifier. The target identifier indicates which storage device 600 to access. FIG. 1 shows one storage device 600 as an example. In some other embodiments, the data decryption system 100 is connected to a plurality of storage devices. Each storage device contains its identifier for preventing transmission errors.

In some embodiments, the memory 120 includes queues for storing the address and queues for storing the identifiers. For example, the address checking circuit 110 transmits the address to the memory 120. The address is stored in the address queue, and the target identifier is stored in the identifier queue.

In some embodiments, the encryption/decryption processor 130 generates the key for decrypting the reading data which is returned from the storage device 600 (in case that the reading data is the cipher-text data). For example, the encryption/decryption processor 130 executes the block code algorithms, such as Advanced Encryption Standard (AES) algorithm, Data Encryption Standard (DES) algorithm, Rivest Cipher (RC) algorithm, and so on. It should be noted that the encryption/decryption processor 130 applies the existing encryption/decryption algorithm, and the person having ordinary skill in the art can design the circuit of the encryption/decryption processor 130 and/or the encryption/decryption operations by their experiences.

In some embodiments, the register 140 stores the keys (hereinafter referred to as a first key), such as the AES keys, the DES keys, the RS keys, and so on.

Figure 2:
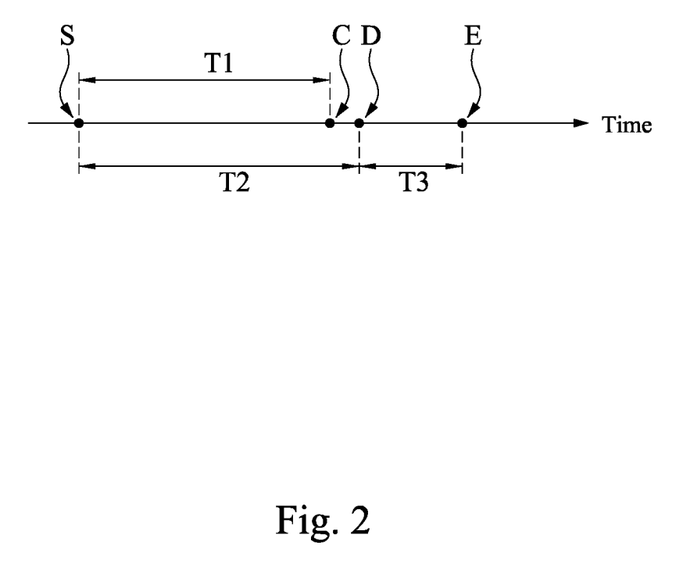
FIG. 2 is a time series for the data decryption system to process data according to some embodiments of the present disclosure.

Reference is made to FIG. 2. FIG. 2 is a time series for the data decryption system 100 to process data according to some embodiments of the present disclosure. As shown in FIG. 1 and FIG. 2, the data decryption system 100 receives the address from the processing system 500 through the address channel 165, the data decryption system 100 transmits the address to the storage device 600. At time point S, the storage device 600 returns the data of the address. In some embodiments, the computation circuit 150 receives the reading data from the storage device 600 through the data channel 173 in a first duration T1. The first duration T1 is the total time that the data decryption system 100 receives the complete data from the storage device 600.

On the other hand, after the data decryption system 100 receives the address from the processing system 500 through the address channel 165, at time point S, the encryption/decryption processor 130 receives the address. In some embodiments, the encryption/decryption processor 130 computes a second key according to a first key and the address in a second duration T2. The second key is provided to decrypt the reading data which is received from the storage device 600 (e.g., the data received by the computation circuit 150 in the first duration T1) by the encryption/decryption processor 130. The second duration T2 is the time that the encryption/decryption processor 130 computes the second key. In some embodiments, the encryption/decryption processor 130 executes the AES algorithm. For example, the encryption/decryption processor 130 reads the AES key (i.e., the first key) at the register 140 and the address in the queue of the memory 120 to execute the encryption procedure. The encryption result is used as the key that the computation circuit 150 decrypts the data from the storage device 600.

In some embodiments, the data decryption system 100 receives the data from the storage device 600, and meanwhile, the data decryption system 100 computes the second key. That is, the first duration T1 overlaps with the second duration T2. In some other embodiments, the first duration T1 partially or completely overlaps with the second duration T2. It depends on the time-length difference between the data-access time length (i.e., the first duration T1) and the key-computation time length (i.e., the second duration T2).

In some embodiments, the data-access time length is smaller than the key-computation time length. Reference is made again to FIG. 2. The computation circuit 150 finishes reading the data at time point C, and the encryption/decryption processor 130 finishes computing the key at time point D. The time point D follows the time point C. After the encryption/decryption processor 130 computes the key for the decrypted data, the computation circuit 150 decrypts the data in a third duration T3. In some other embodiments, if the data-access time length is larger than the key-computation time length and after the computation circuit 150 retrieves the entire data, the computation circuit 150 decrypts the data immediately in the third duration T3. The third duration T3 is the time that the computation circuit 150 decrypts the data. At time point E, the computation circuit 150 finishes the data decryption. The third duration T3 follows the first duration T1 and/or the second duration T2.

In the disclosure, the storage device 600 searches the data according to the address to provide the reading data to the computation circuit 150, and meanwhile, the encryption/decryption processor 130 computes the key. After the data decryption system 100 receives the reading data or finishes computing the key, the data decryption system 100 starts to decrypt the data. Accordingly, compared with the prior art that the key computation procedure is after the data retrieving procedure, the disclosure can save the time for waiting for the storage device 600 to search and transmit the data and the efficiency of the data decryption can be enhanced.

In some embodiments, the computation circuit 150 includes an identification circuit 152, a multiplexer 154, and an XOR circuit 156. The identification circuit 152 is coupled to the memory 120 and the multiplexer 154.

In some embodiments, the identification circuit 152 reads the target identifier from the identifier queue of the memory 120 and the address from the address queue to output an indication signal to a control port of the multiplexer 154, such that the multiplexer 154 chooses one data from a plurality of input ports and the chosen data is forwarded to an output port. For example, when the processing system 500 outputs a plurality of requests for the reading data, the addresses of the requests are transmitted to the data decryption system 100 and the storage device 600 at the same time. Because the received reading data order in the data decryption system 100 from the storage device 600 is not necessarily the same with the received request order in the data decryption system 100 from the processing system 500, the identification circuit 152 has to control the output order of the multiplexer 154 to avoid the problem of the inconsistency between the reading data and the address.

The following shows the embodiments that the computation circuit 150 outputs the decrypted data. When the reading data is transmitted from the storage device 600 through the data channel 173 to the computation circuit 150, the reading data is transmitted to one input port of the multiplexer 154 and the XOR circuit 156 at the same time.

The XOR circuit 156 performs the XOR computation according to the keys which are outputted by the encryption/decryption processor 130 and the reading data, and the XOR circuit 156 outputs the computation result through the data channel 176 to another input port of the multiplexer 154. In some embodiments, the reading data is decrypted by the computation of the XOR circuit 156. In other words, the data of two input ports of the multiplexer 154 are the decrypted data and the encrypted data respectively.

In some embodiments, the address checking circuit 110 records the address segments of the encrypted data in the storage device 600, therefore, the received address can be determined whether the address is directed to the cipher-text data. The information that the address is determined whether it is directed the cipher-text data is transmitted to the identification circuit 152. The information is carried in the indication signal and both the information and the indication signal is transmitted to the control port of the multiplexer 154. Accordingly, if the data requested by the processing system 500 is the cipher-text data, the processing system 500 can receive the correct decrypted data. On the other hand, if the data requested by the processing system 500 is plaintext data, the data decryption system 100 can also return the correct data to the processing system 500 in the disclosure.

It should be noted that the circuit of the computation circuit 150 can be designed based on different decryption algorithms and the disclosure is not limited to applying the identification circuit 152, the multiplexer 154, and the XOR circuit 156 for the computation circuit 150, and the design is provided as some embodiments for illustrations in the disclosure.

Figure 3:
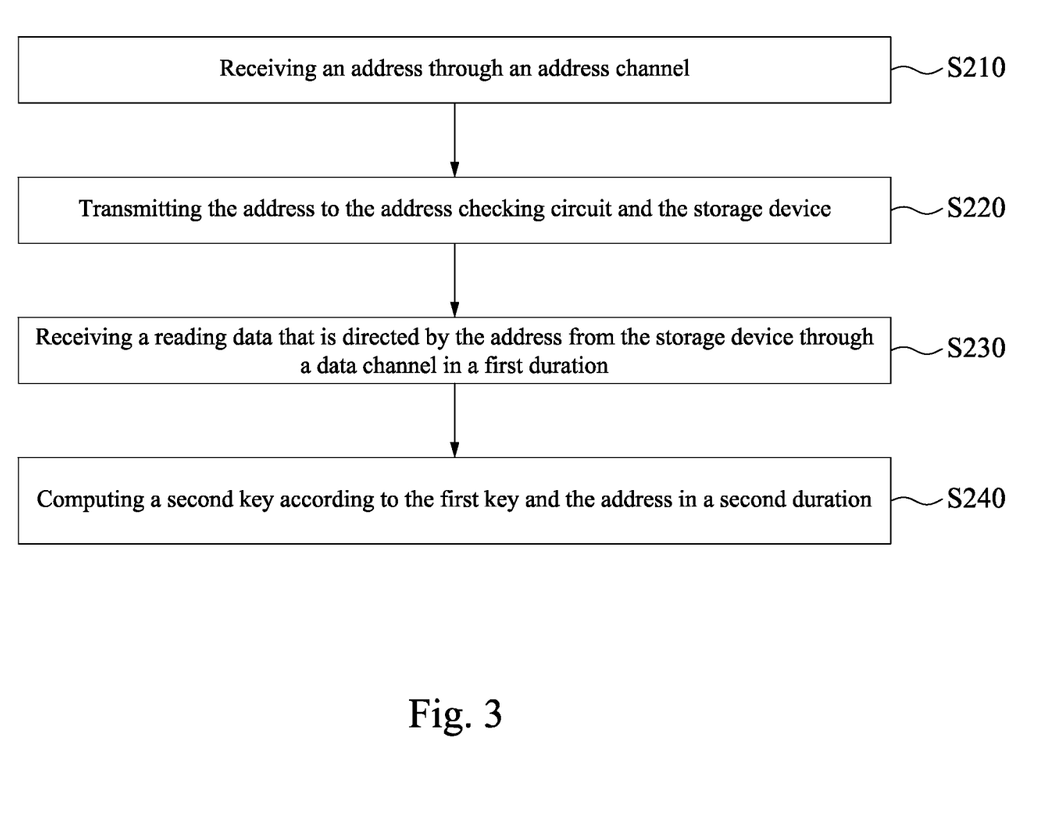
FIG. 3 is a flow chart of a data decryption method according to some embodiments of the present disclosure.

Reference is made to FIG. 3. FIG. 3 is a flow chart of a data decryption method according to some embodiments of the present disclosure. The decryption method can be performed by the data decryption system 100 in FIG. 1. The following description is provided incorporated with FIG. 1 and FIG. 3.

In step S210, receiving an address through an address channel 165 is performed.

In step S220, transmitting the address to the address checking circuit 110 and the storage device 500 is performed.

In step S230, receiving a reading data that is directed by the address from the storage device 500 through a data channel 173 in a first duration is performed.

In step S240, computing a second key according to the first key and the address in a second duration is performed. The first duration overlaps with the second duration.

In some embodiments, the data decryption method is configured to a mixture type storage device. In the mixture type storage, the spaces of the storage device are not all the cipher-text spaces (storing the cipher-text data) or the plaintext spaces (storing the plaintext data).

Figure 4:
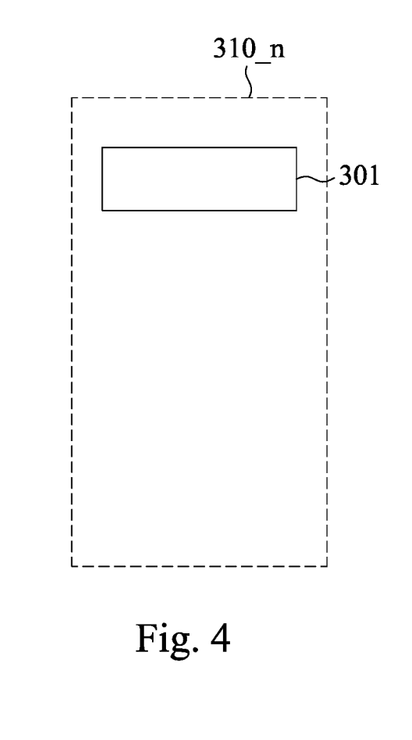
FIGS. 4-6 are block diagrams of a mixture storage medium that is suitable for the data decryption method according to some embodiments of the present disclosure.
Figure 5:
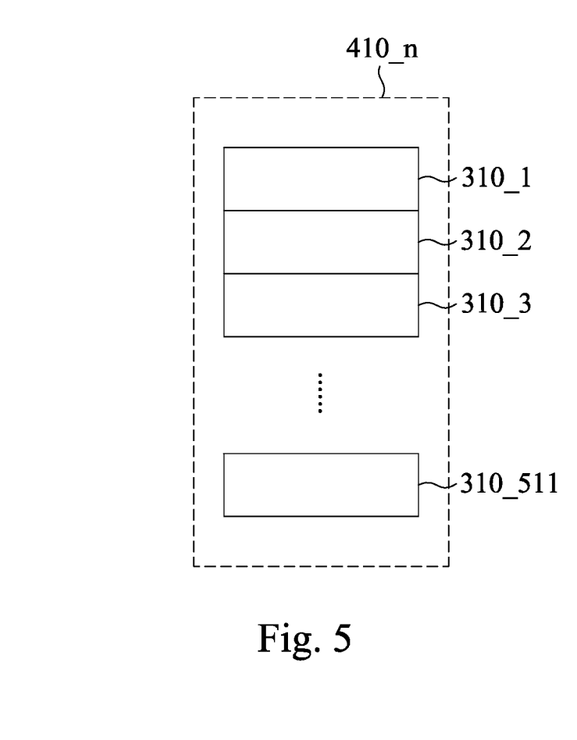
Figure 6:
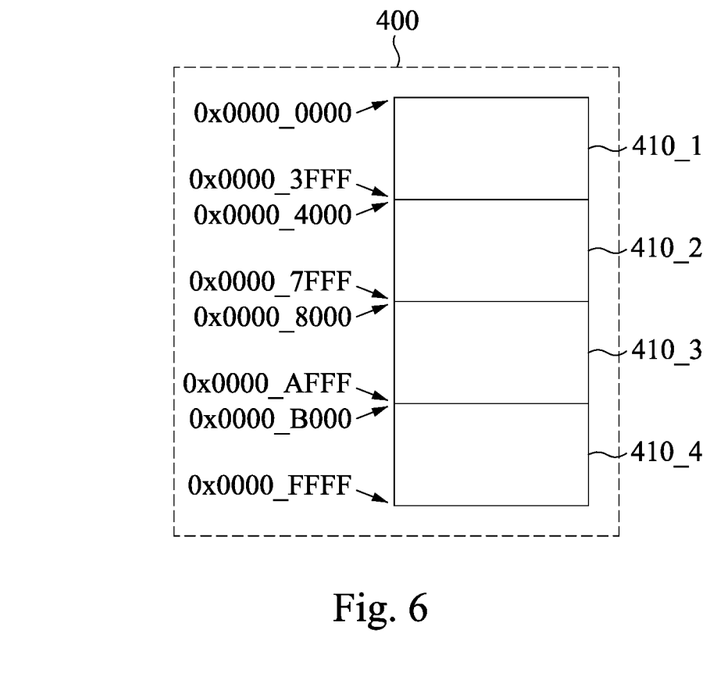

FIGS. 4-6 are block diagrams of the mixture storage medium that is suitable for the data decryption method according to some embodiments of the present disclosure. The spaces of the storage device (such as flash, DDR, SRAM, and so on) of the prior art include blocks, pages, and sections. One page includes a plurality of blocks. One segment includes a plurality of pages. In the prior art, all the spaces of the storage device are sorted into the cipher spaces such that the data encryption function can be applied. The decryption method in the disclosure supports that one segment includes a plurality of plaintext pages and a plurality of cipher-text pages.

As shown in FIG. 4, the block 310_n includes a block space 301. In some embodiments, the block space 301 is 32 bytes. The requested address referred to in FIG. 1 and FIG. 3 is the address of the block 310_n, such that the data decryption system 100 can decrypt the 32-byte data of the block.

As shown in FIG. 5, the page 410_n includes a plurality of blocks. For example, the page 410_n includes 511 blocks 310_1, 310_2, . . . , 310_511. In some embodiments, the page 410_n includes a plurality of blocks storing the cipher-text data and a plurality of blocks storing the plaintext data.

In some embodiments, the encryption/decryption processor 130 generates the cipher-text data according to the block address of the block 310_2 and the key of the register 150 (such as the AES key). The generated cipher-text data is taken as a block key (hereinafter referred to as a first block key) that the computation circuit 150 can decrypt the data of the block 310_2. In some other embodiments, the encryption/decryption processor 130 generates the cipher-text data according to the block address of the block 310_3 and the key of the register 150. The generated cipher-text data is taken as a block key (hereinafter referred to as a second block key) that the computation circuit 150 can decrypt the data of the block 310_2. The first block key is different from the second key.

In some embodiments, when all blocks of the page 410_n store the cipher-text data or all the blocks of the page 410_n store the plaintext data, the page 410_n is called the cipher page or the plaintext page.

As shown in FIG. 6, the segment 400 includes a plurality of pages, such as the pages 410_1, 410_2, 410_3, and 410_4. The addresses of the pages 410_1, 410_2, 410_3, and 410_4 are 0x0000_0000, 0x0000_4000, 0x0000_8000, and 0x0000_13000 respectively. In some embodiments, the segment 400 includes a plurality of pages storing the cipher-text data and a plurality of pages storing the plaintext-data. For example, as shown in FIG. 6, when the page 410_2 is the cipher-text page (i.e., all blocks of the page store the cipher-text data), the encryption/decryption processor 130 generates a segment key (hereinafter referred to as a first segment key) according to the segment address 0x0000_4000 of the segment 400 and the AES key. The first segment key is applied to decrypt the data associated with the segment address 0x0000_4000 (i.e., the page 410_2). Similarly, when the page 410_3 is the cipher-text page, the encryption/decryption processor 130 generates a segment key (hereinafter referred to as a second segment key) according to the segment address 0x0000_8000 of the segment 400 and the AES key. The second segment key is applied to decrypt the data associated with the segment address 0x0000_8000 (i.e., the page 410_3). The first segment key is different from the second segment key.

In some other embodiments, the generated keys are different from each other based on the addresses of the different pages and/or segments. Furthermore, the encryption/decryption processor 130 applies different encryption keys, for example, one page and/or segment associated with one AES key, to enhance the data encryption/decryption security strength.

In some other embodiments, the decryption key is computed by using the same one address for the plurality of blocks of the page or the plurality of pages of the segment. That is, the plurality of blocks of the page uses the same block key and the plurality of pages of the segment uses the same segment key. For example, the encryption/decryption processor 130 computes the segment key according to the segment address 0x0000_4000. The segment key can be applied to decrypt the cipher-text data of the pages 410_2 and 410_3. Therefore, the computation cost is reduced and the decryption efficiency is enhanced.

The decryption engine of the prior art needs to wait for the external storage device to read and return the data, and the key for decrypting data is computed then. However, it wastes the time of the decryption engine waiting for reading data. The data decryption system and the data decryption method in the disclosure provides the mechanism that in the duration of the data which is read out from the storage device, the key for decrypting the data can be computed simultaneously. Therefore, after the reading data is obtained, the procedure for decrypting the reading data can be started immediately, such that the idle time is reduced and the efficiency is enhanced. Furthermore, the disclosure is not limited to the usage condition of the storage device, and the storage device can be used for storing a part of cipher-text data and a part of plaintext data, such that the storage device has the flexibility.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A data decryption system, comprising:
   an address checking circuit configured to receive an address through an address channel;
   an encryption/decryption processor; and
   a computation circuit coupled to the encryption/decryption processor, wherein the computation circuit is configured to receive a reading data of the address from a storage device through a data channel in a first duration;
   wherein the encryption/decryption processor computes a second key in a second duration according to a first key and the address, and the second key is configured to decrypt the reading data, wherein the first duration overlaps with the second duration;
   wherein the storage device comprises a segment, and the encryption/decryption processor is further configured to:
   generate a first segment key according to a first address of the segment and the first key, wherein the first segment key is configured to decrypt data of the first address; and
   generate a second segment key according to a second address of the segment and the first key, wherein the second segment key is configured to decrypt data of the second address;
   wherein the segment comprises a cipher-text page and a plaintext page.

2. The data decryption system of claim 1, wherein the first duration partially or completely overlaps with the second duration.

3. The data decryption system of claim 2, wherein a target identifier which corresponds to the address is transmitted to the address checking circuit through the address channel, and the data decryption system further comprises:
   a memory coupled to the address checking circuit and the encryption/decryption processor, wherein the memory is configured to store the target identifier in a queue.

4. The data decryption system of claim 3, wherein the computation circuit further comprises:
   an XOR circuit coupled to the encryption/decryption processor, wherein the XOR circuit is configured to generate a decrypted data according to the second key and the reading data in a third duration, wherein the third duration follows the first duration or the second duration.

5. The data decryption system of claim 4, wherein the computation circuit further comprises:
   an identification circuit configured to read the target identifier of the queue from the memory to generate an indication signal.

6. The data decryption system of claim 5, wherein the computation circuit further comprises:
   a multiplexer configured to receive the decrypted data from the XOR circuit, receive the reading data from the storage device, and output one of the decrypted data and the reading data according to the indication signal.

7. The data decryption system of claim 2, wherein the encryption/decryption processor generates the second key according to a block address of a plurality of blocks of the storage device, wherein the second key is configured to decrypt one of the plurality of blocks by the computation circuit.

8. The data decryption system of claim 1, further comprising:
   a register coupled to the encryption/decryption processor, wherein the register is configured to store the first key.

9. A data decryption method, comprising:
   transmitting an address through an address channel to an address checking circuit and a storage device;
   receiving a reading data of the address from the storage device through a data channel in a first duration; and
   computing a second key in a second duration according to a first key and the address, wherein the first duration overlaps with the second duration;
   wherein the storage device comprises a segment, and the data decryption method further comprises:
   generating a first segment key according to a first address of the segment and the first key, wherein the first segment key is configured to decrypt data of the first address; and
   generating a second segment key according to a second address of the segment and the first key, wherein the second segment key is configured to decrypt data of the second address;
   wherein the segment comprises a cipher-text page and a plaintext page.

10. The data decryption method of claim 9, wherein the first duration partially or completely overlaps with the second duration.

11. The data decryption method of claim 10, further comprising:
    transmitting a target identifier which corresponds to the address through the address channel to the address checking circuit; and
    storing the target identifier in a queue.

12. The data decryption method of claim 11, further comprising:
    generating decrypted data according to the second key and the reading data in a third duration, wherein the third duration follows the first duration or the second duration.

13. The data decryption method of claim 12, further comprising:
    reading the target identifier of the queue to generate an indication signal according to the target identifier.

14. The data decryption method of claim 13, further comprising:
    receiving the decrypted data; and outputting one of the decrypted data and the reading data according to the indication signal.

15. The data decryption method of claim 10, further comprising:
  generating the second key according to a block address of a plurality of blocks of the storage device, wherein the second key is configured to decrypt one of the plurality of blocks.

16. The data decryption method of claim 9, further comprising:
  storing the first key in a register.

\* \* \* \* \*